US012122641B2

(12) United States Patent
Kubo et al.

(10) Patent No.: US 12,122,641 B2
(45) Date of Patent: Oct. 22, 2024

(54) ELEVATOR DEVICE

(71) Applicant: Hitachi, Ltd., Tokyo (JP)

(72) Inventors: Yosuke Kubo, Tokyo (JP); Tomohisa Hayakawa, Tokyo (JP); Hidetaka Zama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 18/010,507

(22) PCT Filed: Jun. 29, 2020

(86) PCT No.: PCT/JP2020/025494

§ 371 (c)(1),
(2) Date: Dec. 15, 2022

(87) PCT Pub. No.: WO2022/003768

PCT Pub. Date: Jan. 6, 2022

(65) Prior Publication Data

US 2023/0257231 A1 Aug. 17, 2023

(51) Int. Cl.
*B66B 5/16* (2006.01)

(52) U.S. Cl.
CPC .................................... *B66B 5/16* (2013.01)

(58) Field of Classification Search
CPC .................................................. B66B 5/16
See application file for complete search history.

(56) References Cited

U.S. PATENT DOCUMENTS

2012/0000729 A1 1/2012 Marvin et al.

FOREIGN PATENT DOCUMENTS

| | | | | | |
|---|---|---|---|---|---|
| JP | 2010-89930 | A | | 4/2010 | |
| JP | 2013-189283 | A | | 9/2013 | |
| JP | 2019-1582 | A | | 1/2019 | |
| JP | 2019-6573 | A | | 1/2019 | |
| JP | 2019-77533 | A | | 5/2019 | |
| WO | WO-2005115904 | A1 | * | 12/2005 | B66B 5/04 |
| WO | WO-2013092239 | A1 | * | 6/2013 | B66B 5/16 |
| WO | WO 2020/110437 | A1 | | 6/2020 | |
| WO | WO-2021166318 | A1 | * | 8/2021 | |
| WO | WO-2021214867 | A1 | * | 10/2021 | |

(Continued)

OTHER PUBLICATIONS

Machine Translation of WO 2013092239.*

(Continued)

*Primary Examiner* — Diem M Tran

(74) *Attorney, Agent, or Firm* — Crowell & Moring LLP

(57) ABSTRACT

An elevator device adapted to improve the operational reliability of an electric actuator in an installation environment is disclosed. The electric actuator actuates a safety gear. The elevator device includes: a car (1); a safety gear (2) mounted to the car; and an electric actuator (10) mounted to the car and operative to actuate the safety gear. The electric actuator includes: a housing (30); a mechanism part located in the housing; and an operation lever (11) connected to the mechanism part and extended from the inside of the housing to the outside of the housing through an opening of the housing. The housing includes a cover member (32) for covering the opening. The operation lever is inserted through the cover member.

11 Claims, 3 Drawing Sheets

(56) References Cited

FOREIGN PATENT DOCUMENTS

| | | | |
|---|---|---|---|
| WO | WO-2022038656 A1 | * | 2/2022 |
| WO | WO-2022123624 A1 | * | 6/2022 |

OTHER PUBLICATIONS

International Search Report (PCT/ISA/210) issued in PCT Application No. PCT/JP2020/025494 dated Sep. 15, 2020 with English translation (five (5) pages).

Japanese-language Written Opinion (PCT/ISA/237) issued in PCT Application No. PCT/JP2020/025494 dated Sep. 15, 2020 (three (3) pages).

* cited by examiner

ELEVATOR DEVICE

TECHNICAL FIELD

The present invention relates to an elevator device equipped with a safety gear actuated by an electric actuator.

BACKGROUND ART

The elevator device has a governor and the safety gear for the purposes of always monitoring an elevating speed of the car and bringing the car into emergency stop when the car falls into an overspeed state. In general, the car and the governor are combined together by means of a governor rope. When detecting the overspeed state of the car, the governor actuates the safety gear on the car by restraining the governor rope. Thus, the car is brought into an emergency stop.

In such an elevator device, the governor rope as a long object is installed in a hoistway, making it difficult to achieve space saving and cost reduction. In a case where the governor rope swings, a machine structure and the governor rope in the hoistway easily interfere with each other.

Conversely, a safety gear without the governor rope has been proposed.

A prior art technique related to a safety gear free from the governor rope is disclosed in Patent literature 1. According to the prior art, a braking unit including a wedge-shaped brake shoe is provided under the car. The brake shoe is connected to a braking linkage. When a solenoid is actuated in response to a command from a controller, the braking strut is moved up by means of a mechanism interlocked with the solenoid. Thus, the brake shoe is pulled up so that the car is braked.

CITATION LIST

Patent Literature

Patent Literature 1: Japanese Patent Application Laid-Open No. 2013-189283

SUMMARY OF INVENTION

Technical Problem

In the known safety gear, which is actuated by the actuator operated by the solenoid as described above, the safety gear may be decreased in operational reliability in a case where dusts adhere to a movable mechanism part of the actuator or where the movable mechanism part is damaged upon contact with some article, in an installation environment.

Hence, the present invention provides an elevator device equipped with a safety gear adapted to enhance the operational reliability of the electric actuator in the installation environment.

Solution to Problem

For solving the above problem, the elevator device according to the present invention includes: a car; a safety gear mounted to the car; and an electric actuator mounted to an upper part of the car and operative to actuate the safety gear, and has a configuration wherein the electric actuator includes: a housing; a mechanism part disposed in the housing; and an operation lever connected to the mechanism part and extended from the inside of the housing to the outside of the housing through an opening of the housing, the housing includes a cover member covering the opening, and the operation lever is inserted through the cover member.

Advantageous Effects of Invention

According to the present invention, the electric actuator can be improved in the operational reliability thereof in the installation environment.

Other objects, features and advantageous effects will become apparent from the following description of example hereof.

DESCRIPTION OF EMBODIMENTS

Figure 1:
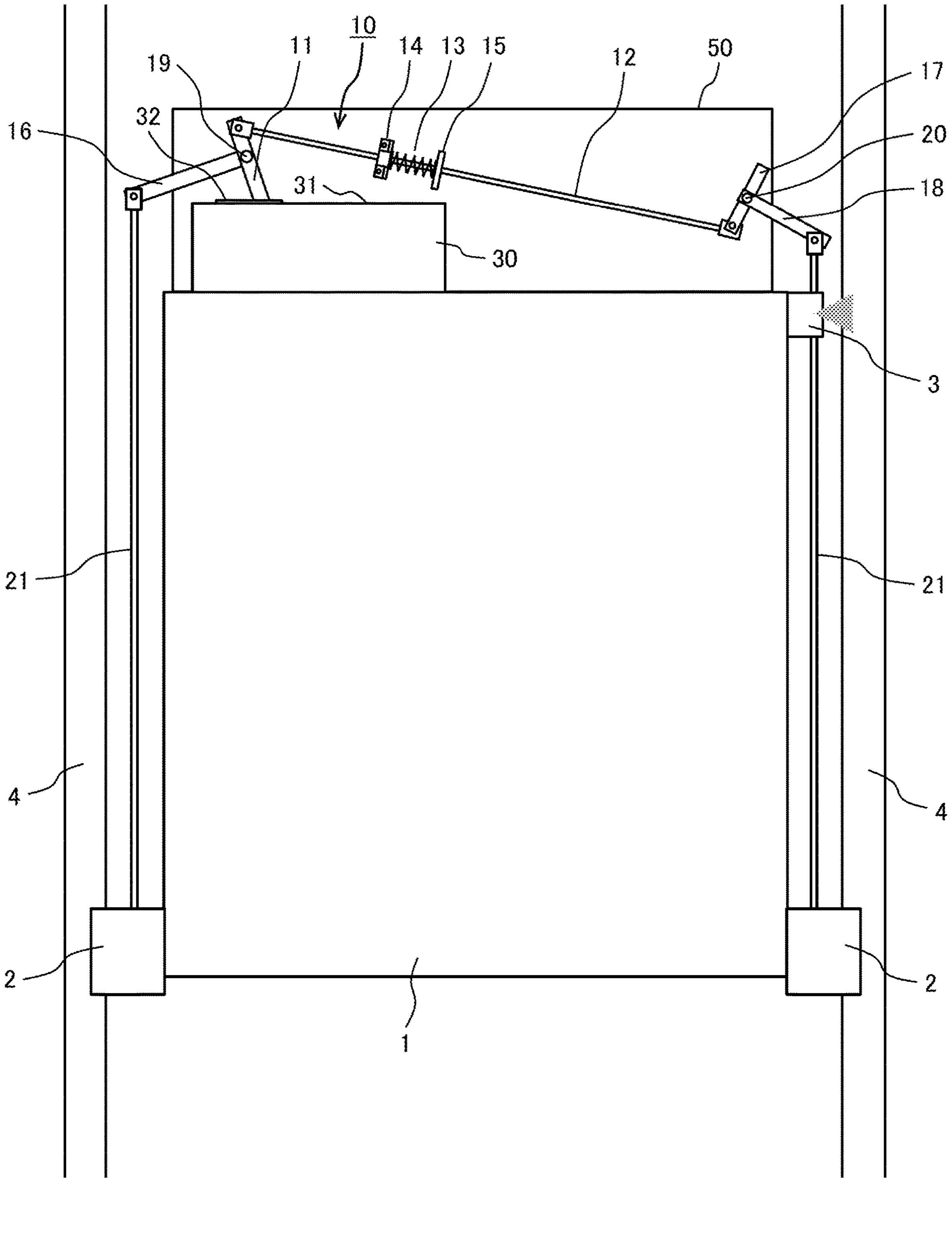
FIG. 1 is a schematic configuration diagram showing an elevator device according to an example.

An elevator device as an embodiment according to the present invention will hereinbelow be described with an example referring to the accompanying drawings. In the drawings, the same or similar reference numerals are used to refer to the same structural elements or structural elements having the same or similar functions.

FIG. 1 a schematic configuration diagram showing an elevator device that is an example according to the present invention.

As shown in FIG. 1, the elevator device includes: a car 1; a position sensor 3; an electric actuator 10; a drive mechanism (12 to 20); a lifting rod 21; and a safety gear 2.

The car 1 is hung on a main rope (not shown) in a hoistway provided in a building and is slidably engaged with a guide rail 4 by a guide device. When the main rope is frictionally driven by a driving device (traction machine, not shown), the car 1 is moved up and down in the hoistway.

The position sensor 3, which is mounted to the car 1, detects the position of the car 1 in the hoistway and always detects an elevating speed of the car 1 based on the detected position of the car 1. That is, the overspeed state of the car going over a predetermined speed limit can be detected by the position sensor 3.

According to the example, the position sensor 3 includes an image sensor. Based on image information acquired by the image sensor on a surface condition of a guide rail 4, the position sensor detects the position and the speed of the car 1. For example, the position of the car 1 is detected by checking image information acquired by the image sensor against image information which is previously measured on the surface condition of the guide rail 4 and stored in a memory device.

It is noted that a rotary encoder which is mounted to the car and rotates with the movement of the car is also usable as the position sensor.

According to the example, the electric actuator 10 is an electromagnetic actuator and is mounted to an upper part of the car 1. The electromagnetic actuator includes a movable piece or a movable bar which is actuated by a solenoid or electromagnet. The electric actuator 10 operates when the position sensor 3 detects a predetermined overspeed state of the car 1. At this time, the lifting rod 21 is lifted by the drive mechanism (12 to 20) connected to an operation lever 11. This brings the safety gear 2 into a brake state.

Incidentally, the drive mechanism (12 to 20) will be described hereinafter.

The safety gear 2 is disposed on each side of the car 1, respectively. A pair of brake shoes (not shown) mounted to each of the safety gears 2 is movable between a brake position and a non-brake position. At the brake position, the brake shoes clamp the guide rail 4 therebetween. When the brake shoes are relatively moved up with a downward movement of the car 1, a breaking force is generated by a frictional force applied between the brake shoes and the guide rail 4. Thus, the safety gear 2 is actuated when the car 1 falls into the overspeed state, and brings the car 1 into an emergency stop.

The elevator device according to Example hereof has a so-called ropeless governor system which does not use the governor rope. When the elevating speed of the car 1 exceeds a rated speed to reach a first overspeed (for example, a speed less than 1.3 times the rated speed), power supply to the driving device (traction machine) and power supply to a controller for controlling this driving device are shut off. When a descending speed of the car 1 reaches a second overspeed (for example, a speed less than 1.4 times the rated speed), the electric actuator 10 mounted to the car 1 is electrically driven to actuate the safety gear 2 so that the car 1 is brought into the emergency stop.

According to the example hereof, the ropeless governor system includes the above-described position sensor 3, and a safety controller for determining the overspeed state of the car 1 based on an output signal from the position sensor 3. This safety controller measures a speed of the car 1 based on an output signal from the position sensor 3. Upon determining that the measured speed has reached the first overspeed, the safety controller outputs command signals to shut off the power to the driving device (traction machine) and the power to the controller for controlling the driving device. Upon determining that the measured speed reaches the second overspeed, the safety controller outputs a command signal to actuate the electric actuator 10.

When the pair of brake shoes of the safety gear 2 is lifted by the lifting rod 21, the pair of brake shoes clamps the guide rail 4 therebetween. The lifting rod 21 is driven by the drive mechanism (12 to 20) connected to the electric actuator 10.

A configuration of the drive mechanism is described as below.

The operation lever 11 and a first operation piece 16 of the electric actuator 10 are interconnected to form a first link member substantially shaped like "T". The operation lever 11 and the first operation piece 16 constitute a head portion and a leg portion of the "T" shape, respectively. At an interconnection between the operation lever 11 and the first operation piece 16, the substantially "T" shaped first link member is rotatably supported by a crosshead 50 via a first operation shaft 19. An end of one (on the left side as seen in the figure) of the paired lifting rods 21 is connected to an end of the first operation piece 16 on the opposite side from the interconnection between the operation lever 11 and the first operation piece 16 constituting the "T" shape.

A connection piece 17 and a second operation piece 18 are interconnected to constitute a second link member substantially shaped like "T". The connection piece 17 and the second operation piece 18 constitute a head portion and a leg portion of the "T" shape, respectively. At an interconnection between the connection piece 17 and the operation piece 18, the substantially "T" shaped second link member is rotatably supported by the crosshead 50 via a second operation shaft 20. An end of the other one (on the right side as seen in the figure) of the paired lifting rods 21 is connected to an end of the second operation piece 18 on the opposite side from the interconnection between the connection piece 17 and the second operation piece 18 constituting the leg portion of the "T" shape.

An end of the operation lever 11 extended outward from the inside of a housing 30, and the one of the opposite ends of the connection piece 17 that is closer to the upper part of the car 1 than the second operation shaft 20 are connected to one end (on the left side as seen in the figure) and the other end (on the right side as seen in the figure) of a drive shaft 12 extended above the car 1, respectively. The drive shaft 12 slidably extends through a fixation part 14 fixed to a crosshead 50. The drive shaft 12 passes through a pressure member 15, which is fixed to the drive shaft 12. The pressure member 15 is located proximal to the second link member (the connection piece 17, the second operation piece 18) of the fixation part 14. A drive spring 13 as an elastic body is disposed between the fixation part 14 and the pressure member 15. The drive shaft 12 is inserted through the drive spring 13.

In the example, when the electric actuator 10 is actuated, namely when the electromagnet is de-energized, an electromagnetic force restraining the movement of the operation lever 11 against a biasing of the drive spring 13 dissipates. Hence, the drive shaft 12 is longitudinally driven by a biasing of the drive spring 13 applied to the pressure member 15. Therefore, the first link member (the operation lever 11, the first operation piece 16) rotates about the first operation shaft 19, while the second link member (the connection piece 17, the second operation piece 18) rotates about the second operation shaft 20. As a result, the one lifting rod 21 connected to the first operation piece 16 of the first link member is driven and lifted. Further, the other lifting rod 21 connected to the second operation piece 18 of the second link member is driven and lifted.

According to the example, a housing cover 31 defining a top side of the housing 30 is provided with a flexible cover member 32 at an insertion part for the operation lever 11, as will be described hereinafter. This is effective to prevent the invasion of dusts and foreign substances into the housing where the mechanism part of the electric actuator 10 is contained.

Figure 2:
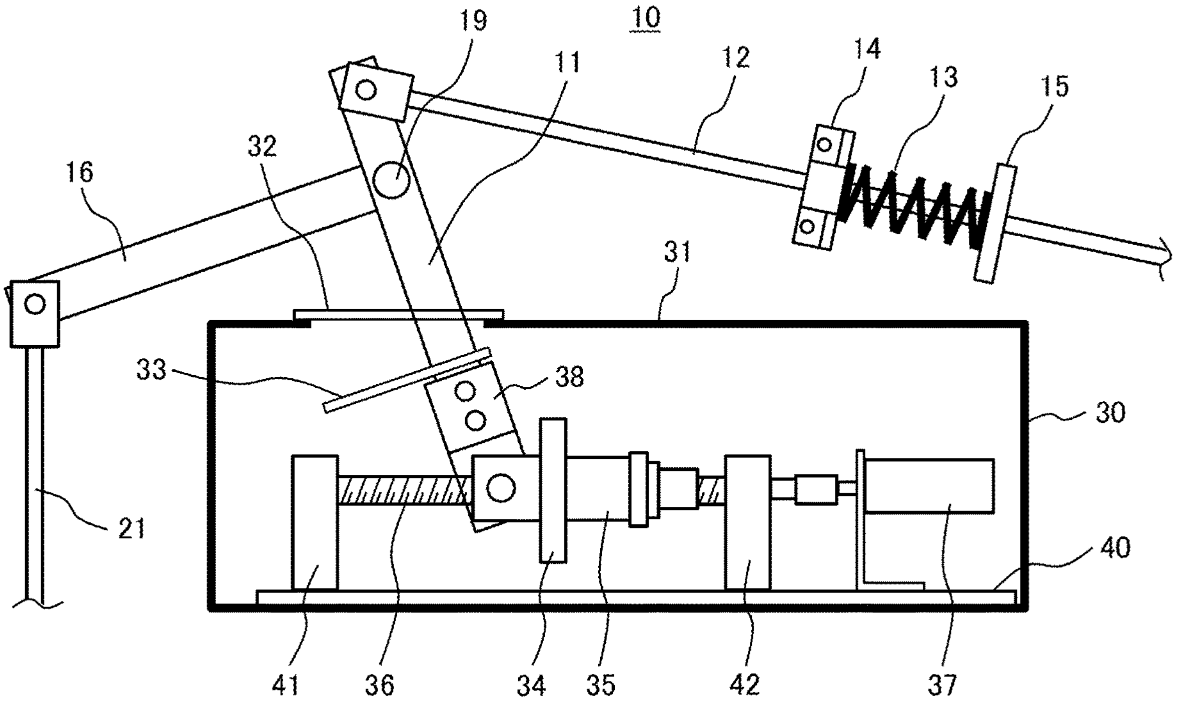
FIG. 2 is a front view showing a mechanism part contained in a housing of an electric actuator according to the example hereof.

FIG. 2 shows the mechanism part of the electric actuator 10 which is contained in the housing 30 of the electric actuator 10 according to the example. FIG. 2 is a front view showing the mechanism part in installation state shown in FIG. 1. As seen in FIG. 2, the safety gear is in a non-operating state while the electric actuator 10 is in a standby state. That is, the elevator device is in normal operation.

In the standby state, as shown in FIG. 2, an armature 34 connected to the operation lever 11 is magnetically attracted by an excited electromagnet 35. Thus, the operation lever 11 is restricted from moving against a biasing of a drive spring 13 (compression spring). It is noted that the operation lever 11 is connected to the armature 34 via a bracket 38 rotatably mounted to the armature 34. In the armature 34, at least a portion electromagnetically stuck on the electromagnet 35 is made of a magnetic material.

Figure 3:
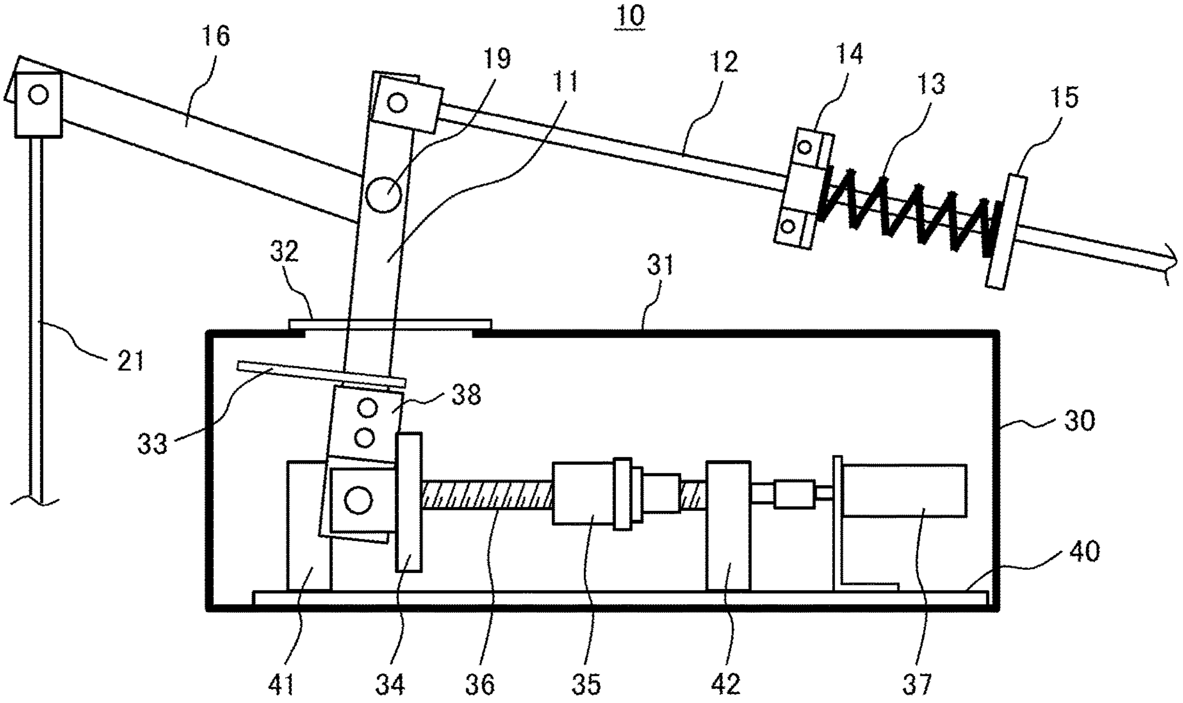
FIG. 3 is a front view showing the mechanism part contained in the housing of the electric actuator according to the example hereof.

The other mechanism parts (36, 37, 40 to 42) shown in FIG. 2 will be described hereinafter (FIG. 3).

According to the example, the flexible cover member 32 for covering an opening through which the operation lever 11 passes in the housing cover 31 defining the top side of the housing 30 is formed at this opening. The opening and is penetrated by the operation lever 11. The cover member 32 is formed of a thin plate of rubber member, for example. Since the cover member 32 is flexible, the motion of the operation lever 11 for actuating the safety gear is not interfered.

The cover member 32 prevents dusts and foreign substances from invading into the housing 30 and from adhering to or contacting with the mechanism parts. Therefore, the electric actuator is improved in the operational reliability in the installation environment (in the hoistway and the like). Thus, the safety gear is improved in the operational reliability.

According to the example, the operation lever 11 is further provided with a plate-shaped member 33. The plate-shaped member 33 is fixed to a connection portion between the bracket 38 and the operation lever 11. In the housing 30, a flat portion of the plate-shaped member 33 is located just below the opening through which the operation lever 11 passes and in its surrounding space and covers the mechanism parts located just below the opening. With this, even though dusts and foreign substances may invade into the housing 30, dusts and foreign substances are prevented from adhering to or contacting the mechanism parts. Therefore, the electric actuator is more surely improved in the operational reliability in the installation environment (in the hoistway and the like). Thus, the safety gear is more surely improved in the operational reliability.

FIG. 3 shows the functional part contained in the housing 30 of the electric actuator 10 according to the example hereof. Namely, FIG. 3 is a front view of the functional part in the installed state as shown in FIG. 1. It is noted that the safety gear in FIG. 3 is in the brake state while the electric actuator 10 is in an operating state. That is, the elevator device is stopped by the safety gear.

When the excitation of the electromagnet 35 is stopped in response to a command from the unillustrated safety controller, an attracting force on the armature 34 dissipates so that the biasing of the drive spring 13 is released to drive the drive shaft 12. When the drive shaft 12 is driven, the operation lever 11 connected to the drive shaft 12 is rotated about the first operation shaft 19. Thus, the first operation piece 16 connected to the operation lever 11 is rotated about the first operation shaft 19. Thus, the lifting rod 21 connected to the first operation piece is lifted.

When the operation lever 11 rotates as described above, the armature 34 connected to the operation lever 11 is moved along the rotation direction of the operation lever 11. As will be described as below, in order to return the electric actuator 10 to the standby state as shown in FIG. 2, the armature 34 is returned from the moved position (FIG. 3) to a position at standby time (FIG. 2) by means of the mechanism parts (36, 37, 40 to 42), the description of which is not described with reference to FIG. 2).

As shown in FIG. 3, the electric actuator 10 includes a feed screw 36 located above a plane part of a substrate 40 in order to drive the armature 34. The feed screw is rotatably supported by a first support member 41 and a second support member 42 which are fixed to the plane part of the substrate 40. The electromagnet 35 includes a nut portion which is threadably engaged with the feed screw 36. The feed screw 36 is rotated by a motor 37.

The electric actuator 10 is returned to the standby state as follows. First, the feed screw is rotated by driving the motor 37 while exciting the electromagnet 35. By the rotating feed screw and the nut portion of the electromagnet 35, the rotation of the motor is converted to a linear movement of the electromagnet 35 along an axial direction of the feed screw. Hence, the electromagnet 35 draws toward the moved position of the armature 34 shown in FIG. 3 so that the armature 34 is acted to the electromagnetic force of the electromagnet 35, sticking fast to the electromagnet 35. When the armature 34 is stuck fast to the electromagnet 35, the feed screw is reversed by reversely rotating the motor 37 while keeping the electromagnet 35 excited. Thus, the armature 34 is moved to the standby position along with the electromagnet 35.

According to the example, the plate-shaped member 33 is fixed to the operation lever 11 within the space of the housing 30. Hence, the plate-shaped member 33 moves along with the operation lever 11. Namely, the plate-shaped member 33 does not interfere with the movement of the operation lever 11.

According to the example, the plate-shaped member 33 and the operation lever 11 are tightly fitted with each other or firmly attached to each other by means of an adhesive agent or a joining material in order to fix the plate-shaped member 33 to the operation lever 11. Therefore, the plate-shaped member 33 and the operation lever 11 are connected to each other with no space formed therebetween. Therefore, the plate-shaped member 33 reliably prevents dusts, foreign substances, and the like from adhering to or contacting the mechanism parts.

Figure 4:
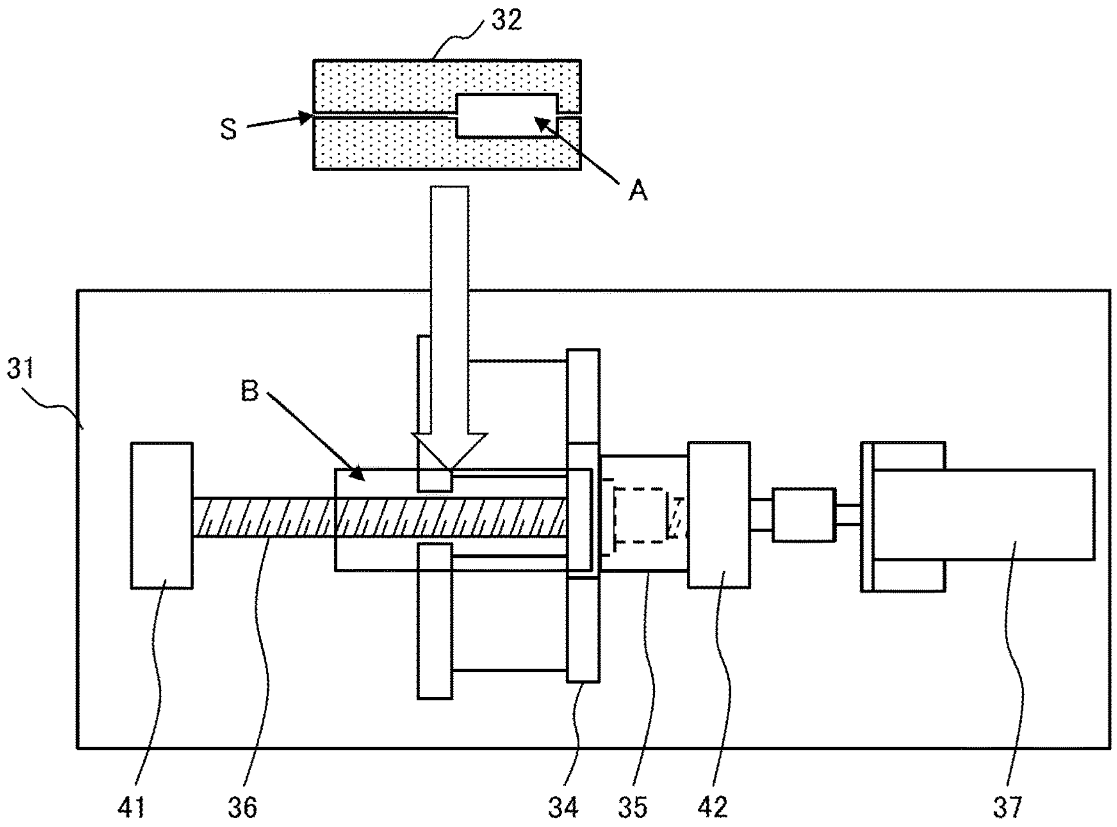
FIG. 4 is a top view of the electric actuator showing a configuration and fixation position of a cover member according to the example hereof.

FIG. 4 is a top view of the electric actuator 10 showing a configuration and fixation position of the flexible cover member 32 according to the example. As seen in FIG. 4, the electric actuator is in the standby state.

At an opening B of the housing cover 31 defining the top side of the housing 30, the cover member 32 is fixed to place in a manner to cover the opening B.

As placed over the opening B, the cover member 32 includes an aperture A at place corresponding to a position passed by the operation lever 11 in the standby state. The cover member 32 further includes a slit S extended in a direction where the operation lever 11 is moved. Incidentally, the slit S may only be in the form of a cut line, including no gap.

Since the cover member 32 is made of a flexible material such as rubber, the cover member warps with the movement of the operation lever 11, not interfering with the movement of the operation lever 11. Furthermore, the cover member 32 includes the slit S according to the example. Hence, the operation lever 11 receives less resistive force from the cover member 32. This ensures the prevention of interference with the movement of the operation lever 11.

Figure 5:
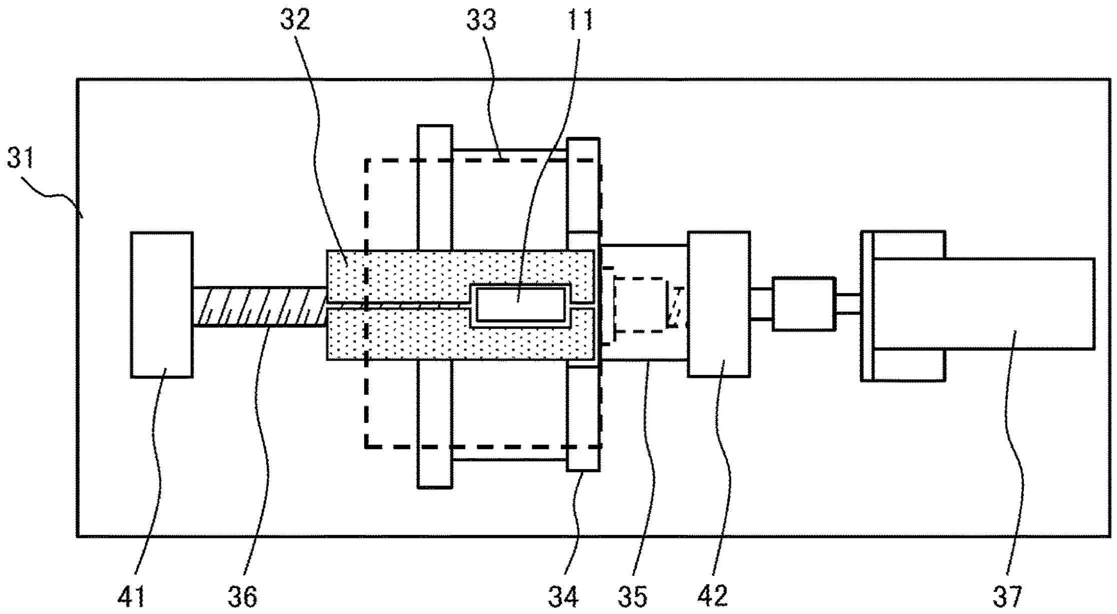
FIG. 5 is a top view of the electric actuator showing a positional relation between the cover member and a plate-shaped member according to the example hereof.

FIG. 5 is a top view of the electric actuator 10 showing a positional relation between the flexible cover member 32 and the plate-shaped member 33 fixed to the operation lever 11 according to the example hereof. In FIG. 5, the plate-shaped member 33 is indicated by a broken line. In FIG. 5, the electric actuator is in the standby state.

The flat portion of the plate-shaped member 33 is located just below the opening B (FIG. 4). Furthermore, the flat portion of the plate-shaped member 33 extends from a region just below the opening B (FIG. 4) in a longitudinal direction of the cover member 32 or the opening B (FIG. 4)

or in a direction perpendicular to the longitudinal direction of the feed screw. Therefore, the plate-shaped member 33 partially overlies the armature 34 connected with the operation lever 11 and the feed screw 36 adjoining the armature 34. This reliably prevents the adhesion or contact of dusts or foreign substances to or with these mechanism parts.

As shown in FIG. 5, a longitudinal direction of the slit S (see FIG. 4) of the cover member 32 is aligned with the axial direction of the feed screw as shown in FIG. 5. Therefore, the cover member 32 does not interfere with not only the motion of the operation lever 11 being shifted from the standby state to the brake state but also the motion of the operation lever 11 being returned to the standby state.

According to the example, as described above, the adhesion or contact of dusts and foreign substances to or with the mechanism parts can be prevented. Thus, the electric actuator can be improved in the operational reliability in the installation environment. Accordingly, the operation of the safety gear and the emergency stop operation of the elevator device are increased in reliability.

It is to be understood that the present invention is not limited to the foregoing example but may include a variety of modifications. For instance, the foregoing example is a detailed description of the present invention for clarity, but the present invention is not necessarily limited to examples including all the components described. A part of the structure of the example permits addition of or replacement with another structure, or cancellation thereof.

For example, the electric actuator 10 may be mounted not only to the upper part of the car 1 but also to a lower part or a side part thereof. Furthermore, the electric actuator can have a linear actuator.

REFERENCE SIGNS LIST

- 1: car
- 2: safety gear
- 3: position sensor
- 4: guide rail
- 10: electric actuator
- 11: operation lever
- 12: drive shaft
- 13: drive spring
- 14: fixation part
- 15: pressure member
- 16: operation piece
- 17: connection piece
- 18: operation piece
- 19: operation shaft
- 20: operation shaft
- 21: lifting rod
- 30: housing
- 31: housing cover
- 32: cover member
- 33: plate-shaped member
- 34: armature
- 35: electromagnet
- 36: feed screw
- 37: motor
- 38: bracket
- 40: substrate
- 41: support member
- 42: support member
- 50: crosshead

The invention claimed is:

1. An elevator device comprising:
a car;
a safety gear device mounted to the car; and
an electric actuator mounted to the car and operative to actuate the safety gear,
wherein the electric actuator includes:
a housing;
a mechanism part disposed in the housing; and
an operation lever connected to the mechanism part and extended from the inside of the housing to the outside of the housing through an opening of the housing,
the housing includes a cover member for covering the opening, and
the operation lever is inserted through the cover member,
wherein the cover member includes a slit extended in a moving direction of the operation lever.

2. The elevator device according to claim 1,
wherein the electric actuator includes a plate-shaped member mounted to the operation lever as located in the housing.

3. The elevator device according to claim 2,
wherein the plate-shaped member is located above the mechanism part.

4. The elevator device according to claim 3,
wherein the plate-shaped member is located just below the cover member.

5. The elevator device according to claim 4,
wherein a flat portion of the plate-shaped member covers an area just below the cover member and is larger than the cover member.

6. The elevator device according to claim 2,
wherein the mechanism part of the electric actuator includes:
an armature connected with the operation lever;
an electromagnet attracting the armature when the electric actuator is in the standby state;
a feed screw threadably engaged with a nut portion of the electromagnet; and
a motor for driving the feed screw, and
the plate-shaped member is disposed on the operation lever and at a connection part between the operation lever and the armature.

7. The elevator device according to claim 6,
wherein a flat portion of the plate-shaped member covers the armature.

8. The elevator device according to claim 1,
wherein the mechanism part of the electric actuator includes:
an armature connected with the operation lever;
an electromagnet attracting the armature when the electric actuator is in a standby state;
a feed screw threadably engaged with a nut portion of the electromagnet; and
a motor for driving the feed screw.

9. The elevator device according to claim 8,
wherein the cover member is located directly above the feed screw.

10. The elevator device according to claim 1, wherein the cover member is flexible.

11. The elevator device according to claim 1, wherein the slit is configured as a cut line without a gap between opposite sides of the slit.

* * * * *